United States Patent
Eakmbe

(10) Patent No.: US 11,952,045 B2
(45) Date of Patent: Apr. 9, 2024

(54) MUDFLAP WITH AERODYNAMIC IMPROVEMENT

(71) Applicant: Volvo Truck Corporation, Gothenburg (SE)

(72) Inventor: Gangaram Baliram Eakmbe, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/709,521

(22) Filed: Mar. 31, 2022

(65) Prior Publication Data
US 2022/0324519 A1    Oct. 13, 2022

(30) Foreign Application Priority Data
Apr. 8, 2021 (EP) ...................... 21167495

(51) Int. Cl.
*B62D 25/16* (2006.01)
(52) U.S. Cl.
CPC ......... *B62D 25/168* (2013.01); *B62D 25/161* (2013.01)
(58) Field of Classification Search
CPC .. B62D 25/168; B62D 25/161; B62D 25/188; B62D 25/18; B62D 35/001; B62D 35/02
See application file for complete search history.

(56) References Cited

U.S. PATENT DOCUMENTS

| | | | | |
|---|---|---|---|---|
| 2,782,053 A | * | 2/1957 | Long | B62D 25/188 160/231.1 |
| 3,350,114 A | * | 10/1967 | Salisbury | B62D 25/18 280/851 |
| 3,497,238 A | * | 2/1970 | Ewell | B62D 25/188 280/851 |
| 4,660,846 A | * | 4/1987 | Morin | B62D 25/188 280/851 |
| 4,858,941 A | * | 8/1989 | Becker | B62D 25/168 280/848 |

(Continued)

FOREIGN PATENT DOCUMENTS

| | | |
|---|---|---|
| DE | 2045212 A1 | 3/1971 |
| FR | 2237462 A6 * | 7/1975 |

(Continued)

OTHER PUBLICATIONS

Extended European Search Report for European Patent Application No. 21167495.7, dated Sep. 22, 2021, 8 pages.

*Primary Examiner* — Steve Clemmons
(74) *Attorney, Agent, or Firm* — Withrow & Terranova, PLLC

(57) ABSTRACT

Mudflap in a wheel arrangement for a vehicle such as a truck or a utility vehicle or a trailer, the mudflap comprising a plate, arranged substantially in a vertical position, the plate being attached to a support in the vehicle, a front side being oriented toward the wheel, and a rear side oriented away from the wheel, the plate having a plurality of holes and closing member(s), wherein each closing member exhibits a rest position in which the closing member closes holes at the rear side thereof, and a deflected position in which a dynamic air pressure pushes the closing member away from its rest position, thereby allowing air to pass through the hole, and thereby reducing the aerodynamic drag of the mudflap.

15 Claims, 4 Drawing Sheets

(56) References Cited

U.S. PATENT DOCUMENTS

| | | | | |
|---|---|---|---|---|
| 5,273,318 | A | * 12/1993 | Nakayama | B62D 25/188 280/851 |
| 5,564,750 | A | 10/1996 | Bajorek et al. | |
| 6,786,512 | B2 | * 9/2004 | Morin | B62D 25/188 280/847 |
| 7,625,013 | B2 | * 12/2009 | Kellick | B62D 25/168 280/847 |
| 9,221,390 | B1 | 12/2015 | Begley et al. | |

FOREIGN PATENT DOCUMENTS

| | | | | |
|---|---|---|---|---|
| GB | 1058892 | A | 2/1967 | |
| GB | 2049590 | A | 12/1980 | |
| GB | 2139974 | A * | 11/1984 | ........... B62D 25/168 |
| KR | 200469891 | Y1 * | 11/2013 | |
| WO | 8900941 | A1 | 2/1989 | |
| WO | WO-8900941 | A1 * | 2/2009 | |
| WO | 2012131062 | A1 | 10/2012 | |

* cited by examiner

FIG. 4
FIG. 5A
FIG. 5B
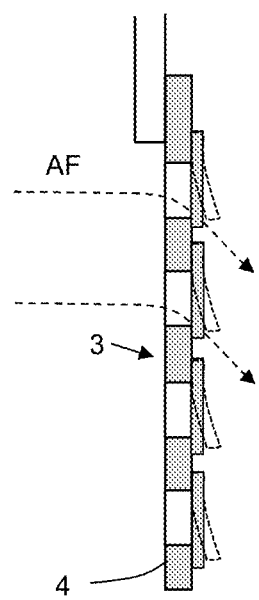
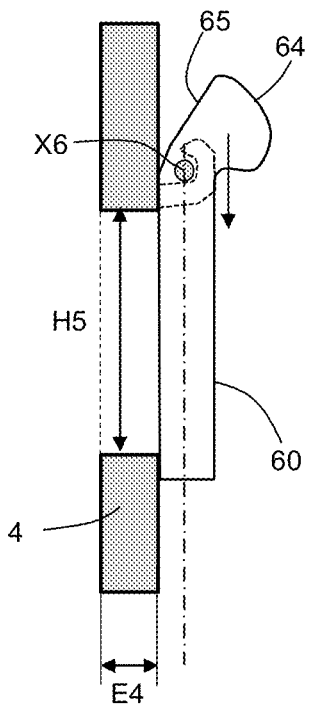
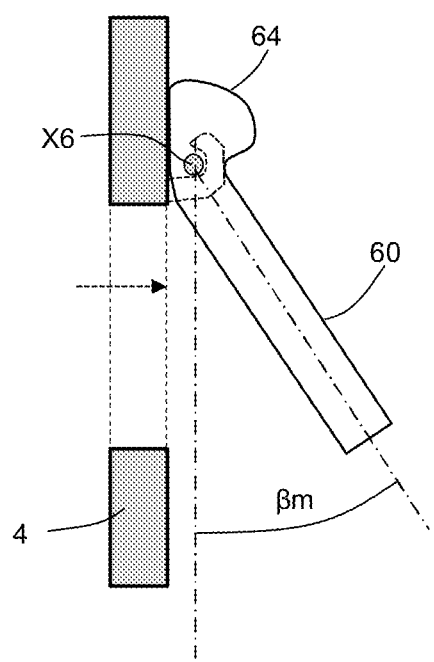
FIG. 6
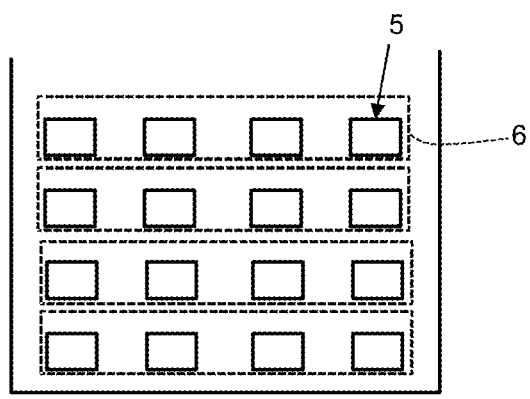

MUDFLAP WITH AERODYNAMIC IMPROVEMENT

RELATED APPLICATIONS

The present application claims priority to European Patent Application No. 21167495.7, filed on Apr. 8, 2021, and entitled "MUDFLAP WITH AERODYNAMIC IMPROVEMENT," which is incorporated herein by reference in its entirety.

FIELD OF THE INVENTION

The present invention relates to mudflaps for trucks and trailers. More particularly, we pay special attention to the aerodynamic behaviour of such mudflaps.

BACKGROUND OF THE DISCLOSURE

Mudflaps for trucks, trailers, utility vehicles and the like are known to protect entities located behind the wheels, in the normal direction of transport, against projections of solid particles or liquid droplets.

However, installing such mudflaps adversely affect the overall aerodynamic performance of the vehicle.

Various efforts have been made to mitigate the adverse aerodynamic effects of mudflaps, like for example in the teachings of GB2049590 and U.S. Pat. No. 9,221,390.

The inventors have found that there remains a need to further improve the compromise between mechanical protection and aerodynamic behaviour.

SUMMARY OF THE DISCLOSURE

According to one aspect, it is provided a mudflap in a wheel arrangement for a vehicle such as a truck or a utility vehicle or a trailer, the mudflap comprising:
  a plate, arranged substantially in a vertical position, in normal use, the plate being attached to a support in the vehicle, a front side being oriented toward the wheel, and a rear side oriented away from the wheel, wherein the plate is made of hard polymer material,
  the plate having a plurality of holes,
  one or more closing member(s),
  wherein each closing member exhibits a rest position in which the closing member substantially closes one or more holes at the rear side thereof, and a deflected position in which a dynamic air pressure pushes the closing member away from its rest position, thereby allowing air to pass through the hole, and thereby reducing the aerodynamic drag of the mudflap, without compromising the protection provided by the mudflap against projections of solid particles or liquid droplets.

We note that in some embodiments, each attached above at least one through-hole.

We note that in some embodiments, each closing member of the plurality of closing members deflects independently from one another. This improves the trade-off between protection and aerodynamic drag.

We note that the plate is a part distinct from the closing members.

Advantageously, at low or medium vehicle speed, i.e., low or medium wheel rotation speed, the closing members close the holes, thus solid particles or liquid droplets are prevented to pass through. Conversely, at high vehicle speed, i.e., high wheel rotation speed, air passage can cross the mudflap, thus the aerodynamic drag is mitigated, thereby improving energy efficiency of the vehicle when compared to a conventional mudflap configuration.

In various embodiments of the invention, one may possibly have recourse in addition to one and/or other of the following arrangements, taken alone or in combination.

According to one option, each closing member is attached at the rear side of the plate, and the closing member deflects rearwards under the dynamic air pressure.

According to one option, each closing member can be formed as a flexible sheet, with a socket portion attached to the plate above the hole, and a deflector portion (i.e., a free portion able to be deflected toward the rear side) located opposite the hole. Said otherwise, when enough air pressure prevails at the front side of the mudflap, the deflector portion is pushed rearwards and opens a passage for air through the hole. The closing member is biased to the rest position thanks to its intrinsic elastic property. It is a simple, sturdy and reliable solution.

According to one option, each closing member can comprise a rigid sheet rotatably mounted on the plate. Further, each closing member is biased by gravity to the closed position. Thereby, the mechanical behavior is not dependent on outside temperature or ageing of the material. Angular stop is easy to achieve from the shape of the top portion shape (foot portion).

According to one option, the closing member is provided with a shaft mounted with a horizontal axis. Thus, a simple and reliable journal arrangement is provided. According to one option, the shat is arranged above the hole intended to be closed by the closure member.

According to one option, the deflected position can exhibit an angular deviation with the rest position, said angular deviation being responsive to an air circulation, said angular deviation being no greater than a predetermined maximum angle. Thereby there is provided a passage for air, but solid particle cannot go straight from the tire projection, solid particle and droplets bounce on the closing member and are backscattered toward the ground.

According to one option, said predetermined maximum angle is comprised between 20° and 50° and is preferably around 30°.

According to one option, the arrangement can be such that each closing member closes a single hole. In such conditions there are as many closing members as holes.

According to one option, one closing member can close several holes in a row (horizontally aligned holes). According to one option, one closing member closes all the holes arranged in a horizontal row.

According to one option, each hole exhibits a rectangular shape. The shape of the hole is similar to the general shape of plate. This provides a good-looking arrangement and an overall aesthetic aspect.

According to one option, the rectangular shape hole can have a height half of the width. This ratio optimizes the mechanical protection versus aerodynamic performance According to one option, the holes can be arranged in an array/grid disposition. For example a 4×4 matrix is provided.

According to one option, the plate can be made of hard polymer material. Cost effectiveness is thus achieved, holes can be obtained directly from molding.

According to one option, one closing member can close several holes in a row.

According to one option, the plate of the mudflap can exhibit a thickness comprised between 5 mm and 15 mm. This provides strength, robustness against mechanical attacks to the plate.

According to one option, each of the closing member can exhibit a thickness comprised between 2 mm and 10 mm, preferably comprised between 3 mm and 5 mm According to one option, a total cross section of the holes is comprised between 30 to 50% of the overall plate area.

According to one option, the plate of the mudflap is rigidly fixed to a support integral with a vehicle chassis. This avoids mudflap dwindling in case of wind.

According to one option, there are provided one or more angular stop to stop the angular deflection of the closing member. This guarantees that soiling particle do not go through in straight line.

The present disclosure is also directed at a wheel arrangement for a vehicle such as a truck or a utility vehicle or a trailer, the wheel arrangement comprising an arcuate wheel cover, and a mudflap as described above. Arcuate wheel cover and mudflap are arranged in continuity of one another.

According to one option, the plate of the mudflap is made integral with the arcuate wheel cover.

According to one alternate option, the plate of the mudflap is attached to a distinct arcuate wheel cover.

The present disclosure is also directed at a vehicle comprising at least a wheel arrangement as described above.

BRIEF DESCRIPTION OF THE DRAWINGS

Other features and advantages of the invention appear from the following detailed description of one of its embodiments, given by way of non-limiting example, and with reference to the accompanying drawings, in which:

FIG. 4 is analogous to FIG. 2 with the mudflap in a rest position.

FIGS. 5A and 5B illustrate enlarged side views of a second embodiment of the mudflap, FIG. 5A showing a rest position, and FIG. 5B showing a deflected position.

FIG. 6 is analogous to FIG. 3 and shows a further embodiment.

DETAILED DESCRIPTION OF THE DISCLOSURE

In the figures, the same references denote identical or similar elements.

Figure 1:
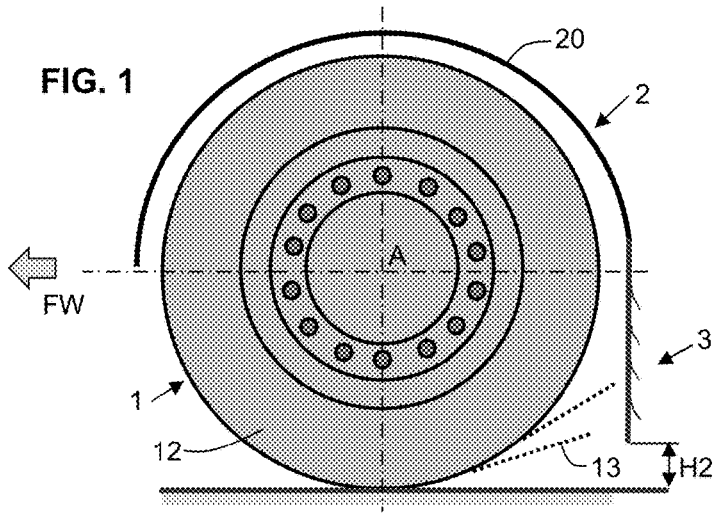
FIG. 1 illustrates a diagrammatic side view of wheel arrangement (2) for a vehicle, in the context of the present invention.

As apparent from FIG. 1, there is provided a wheel arrangement 2 for a vehicle. The vehicle at stake can be a truck, a bus, a heavy-duty vehicle or a utility vehicle. The vehicle can be a trailer. Generally speaking, the vehicle is a road vehicle. The vehicle can have four wheels, six wheels or any number of wheels.

Now for clarity we concentrate on one wheel 1, but it should be noted that several or all wheels can be equipped with the present invention.

When the vehicle moves, the wheel rotates. The forward direction is denoted FW on FIG. 1. The wheel comprises a tire 12. The tire outer surface can have various superficial shapes including grooves.

When the wheel rotates, the periphery of the tire may project liquid or solid items 13 toward the rear direction. Said liquid or solid items 13 are called wheel projections and may comprise water droplets, mud droplets, gravels, particles, small stones. These wheel projections can entail risk of damage for any following vehicle. The following vehicle can be a truck, a passenger car, a motorcycle, etc. The wheel projections can also make the following vehicle(s) dirty. The wheel projections can also provoke damages and/or dirt to the vehicle at stake itself. In a semi-trailer configuration, the wheel projections of the tractor can provoke damages and/or dirt to the trailer. The quantity of the wheel projections depends on the local configuration of the road surface. In particular, the quantity of the wheel projections increases with wet and dirt conditions of the road surface. The velocity of the wheel projections increases in relation with the vehicle speed.

Thus, there is provided a mudflap 3. The purpose of the mudflap 3 is to strongly reduce the adverse effects of the wheel projections on the rear portion of the vehicle at stake itself and on the following vehicles.

In the shown example, the wheel arrangement 2 comprises an arcuate wheel cover 20. In the shown example, the arcuate wheel covers the top half of the wheel, i.e., 180° coverage on both sides from the top point. The arcuate wheel cover can also be named 'wheel housing' or 'wheel casing'.

However, such arcuate wheel cover is optional, the mudflap 3 can be attached to a transverse support. The transverse direction is parallel to the wheel axis A, whereas the longitudinal direction corresponds to front/rear direction.

We note here that the commonly used term 'mudguard' can comprise only the mudflap as explained herein or a combination of a mudflap and an arcuate wheel cover.

In one example, the mudflap extends transversely over the entire width of the tire.

In one example, the mudflap is somewhat wider than the tire, to cope with the oblique projections. In other words, W3 is comprised between 100% and 120% of the tire width.

In one example, W3 can be comprised between 20 cm and 30 cm.

In another example, in the case of twin wheels, the width W3 can be large enough to encompass the two wheels. In such case W3 can be comprised between 50 cm and 70 cm In one example, the mudflap extends vertically over a height denoted H3. The height H3 can be similar to the overall radius of the wheel. In another example, the height H3 can be less than the radius of the wheel.

In one example, H3 can be comprised between 20 cm and 50 cm, preferably between 30 cm and 40 cm. Geometric overall area of the plate is W3×H3.

According to the present disclosure, the mudflap 3 comprises a plate 4, the plate comprising a plurality of holes 5, and one or more closing member(s) 6.

The plate 4 is arranged substantially in a vertical position, in normal use.

The plate 4 is attached to a support in the vehicle, with a front side being oriented toward the wheel, and a rear side oriented away from the wheel.

The plate 4 can be attached fixedly to a support, including possibly the arcuate wheel cover 20. In one example, the plate 4 can be attached with an articulation to a vehicle support. It is not excluded to have the plate 4 rotatably mounted on a support, with a transverse axis.

The plate 4 can be made of hard plastic material chosen in the families like ABS, polyethylenes, polyamides or the like.

The plate 4 has preferably a constant thickness denoted E4. E4 can be comprised between 5 mm and 15 mm. In one other example, E4 can be comprised between 15 mm and 25 mm There are provided in the plate 4 a plurality of holes 5 otherwise named through-bores or openings. Said holes provide a passage from one side of the plate the other side of the plate.

The number of holes can be any from 2 to 16 or more.

The shape of the holes 5 can be rectangular as shown in the figures.

Figure 9:
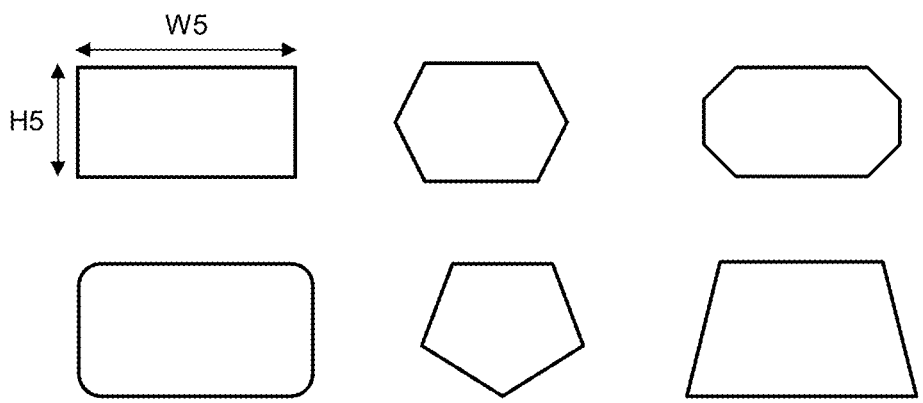
FIG. 9 illustrates various examples of shapes for the holes arranged in the plate of the mudflap.

Also, as depicted at FIG. 9, the shape of the holes 5 can be pentagonal, hexagonal or octagonal. Alternatively, the shape of the holes 5 can be a rounded rectangle or a trapezoid.

It is noted that the width W5 of the hole is generally larger than the height H5 of the hole.

The rectangular shape hole can have a height H5 which is half of the width W5 of the hole.

The inventors have found this ratio optimizes the mechanical protection versus mitigation of aerodynamic drag. Practically, a ratio W5/H5 comprised between 1,5 and 2,5 can be contemplated.

Figure 3:
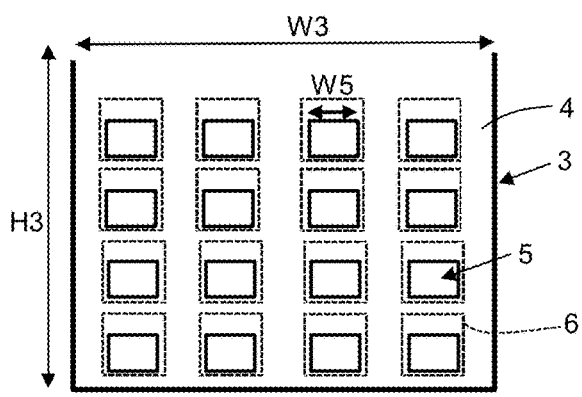
FIG. 3 is exemplary diagrammatic elevation side view of the mudflap, seen from the front side.

In one example, the holes can be arranged in an array/grid disposition. For example, as illustrated on FIG. 3, the holes can be arranged in a 4×4 matrix.

The lower edge of the plate is located at a distance H2 from the guard. H2 can be comprised between 10 cm and 25 cm. A minimum clearance is necessary to compensate for tire compression including the case of a flat tire, and/or to compensate for axle suspension range.

Opposite each hole, there is provided a closing member 6. Such closing member can close a hole or several holes, but under the pressure of an air flow AF, such closing members let air pass through the hole.

Figure 2:
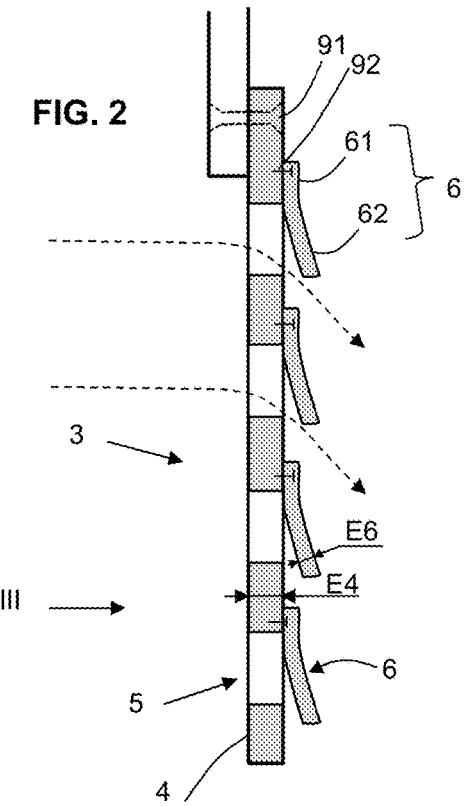
FIG. 2 is exemplary diagrammatic enlarged side view a first embodiment of a mudflap according to the present invention, in a deflected position.

More precisely, each closing member 6 exhibits a rest position in which the closing member substantially closes one or more holes at the rear side thereof (continuous lines FIG. 4), and a deflected position in which a dynamic air pressure pushes the closing member rearwards away from its rest position (dotted lines FIG. 4 and FIG. 2). Closing members can also be named closure members.

As shown in FIG. 2, each closing member can be formed as a flexible sheet, with a socket portion 61 attached to the plate above the hole, and a deflector portion 62 (i.e., a free portion able to be deflected toward the rear side) located opposite the hole 5.

The socket portion 61 attached to the plate at an area located above the hole it is intended to close. The deflector portion 62 is made integral with the socket portion 61, with a homogeneous thickness E6. In one exemplary embodiment, the thickness E6 is comprised between 2 mm and 10 mm. In a preferred embodiment, the thickness E6 is comprised between 3 mm and 5 mm Each closing member of the plurality of closing members deflects independently from one another.

The closing member is elastically biased to the rest position i.e., closed position. The closing member can be made of flexible polymer like polyurethane. Further, since the socket portion 61 attached to the plate at an area located above the hole, the gravity tends to restore naturally the rest position.

In the closed position, the closing member prevents ingress of projected items of wheel projections to pass through the holes. Therefore, when all closing members are closed, the mudflap behaves like a monolithic conventional mudflap.

Conversely, when closing members are opened (i.e., deflected), air can pass through the mudflap, thus the aerodynamic drag is mitigated, thereby improving energy efficiency of the vehicle when compared to a conventional mudflap configuration.

It is noted though that the air flow AF passing through the hole is deviated towards the ground. Therefore, even though some particles or droplets can cross the plate, their trajectory is deviated and the risk of making dirty or damaging following vehicles or rear portions of the vehicle of interest is decreased.

According to another example, illustrated in FIGS. 5A and 5B, each closing member 6 can comprise a rigid sheet 60 rotatably mounted on the plate. A shaft arrangement, centered on axis X6, is received on a bearing (hook-type as illustrated or the like). Axis X6 is located above a top edge of the hole.

At a back portion with regard to the rigid sheet, there is provided a foot 64 formed integrally with the rigid sheet. The foot portion 64 comprises a stop wall 65. The foot portion allows a deflection of the rigid sheet up to a predetermined maximum angle βm. FIG. 5B shows the situation where the stop wall 65 abuts on the rear side of the plate.

In one example, βm is 30°. The maximum angular deviation βm is chosen to avoid any possible direct trajectory across the holes from the tire local tangent direction. Mechanical protection is thus provided for any entities situated behind the mudflap. Generally, according to the possible geometric configurations, maximum angular deviation βm can be chosen between 20° and 50°.

In one example, βm is different according to the vertical position of the closure members. For example, βm can be 25° for the lower row of holes, 28° for the second row, and so on, 36° for the top row.

Under this maximum deflection, thereby there is provided a passage for air, but solid particle cannot go straight from the tire projection, solid particle and droplets bounce on the closing member and are backscattered toward the ground.

Due to gravity and the shape of the foot portion 64, the closing member is returned naturally to the rest position i.e., closed position. Under vehicle motion, the dynamic air pressure pushes the closing member away from the rest position. The closing member can be deflected up to the maximum angle.

In one example, the arrangement can be such that each closing member closes a single hole. There are provided as many closing members as holes.

According to another example, as illustrated at FIG. 6, one closing member can close several holes in a row. Said otherwise, all holes horizontally aligned are closed by a single closing member. Here, in the shown example, one closing member is facing four holes. Generally speaking, if there are N1 holes in each horizontal row, and N2 rows arranged one above another, there are provided N1×N2 holes, but there are provided only N2 closing members.

The size of the holes remains small and the inventors have found that this represents the most cost-effective solution to prevent damage to the closing member from somewhat large gravel or stone (they are stopped by the plate, not by the closing member). Since large particles are stopped by the plate, they cannot impact the closure members. Generally, closure members can thus be less sturdy than the plate, for all possible configurations.

With only one closure member per row, the cost of installing closing members can be minimized In one example, it is contemplated to have a total cross section of the holes of at least 300 mm$^2$.

In one example, a total cross section of the holes is 30 to 50% of the overall plate area (W3×H3).

Figure 8:
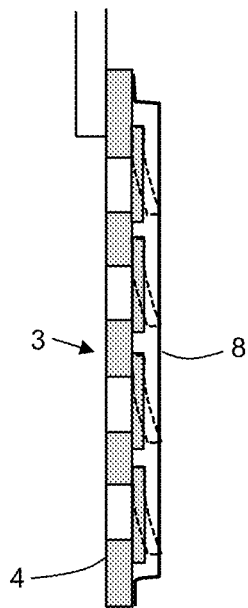
FIG. 8 is analogous to FIG. 2 and shows an exemplary solution to limit the angular deflection of the closing members.

Regarding the maximum angle deviation, as illustrated on FIG. 8, this function can be provided by a grid 8 to provide a rear stop for the angular opening of the closing members 6. The grid 8 is arranged at the rear side of the plate.

The grid can be mesh of fine wires, they are not impacted directly by gravels or stones.

Figure 7:
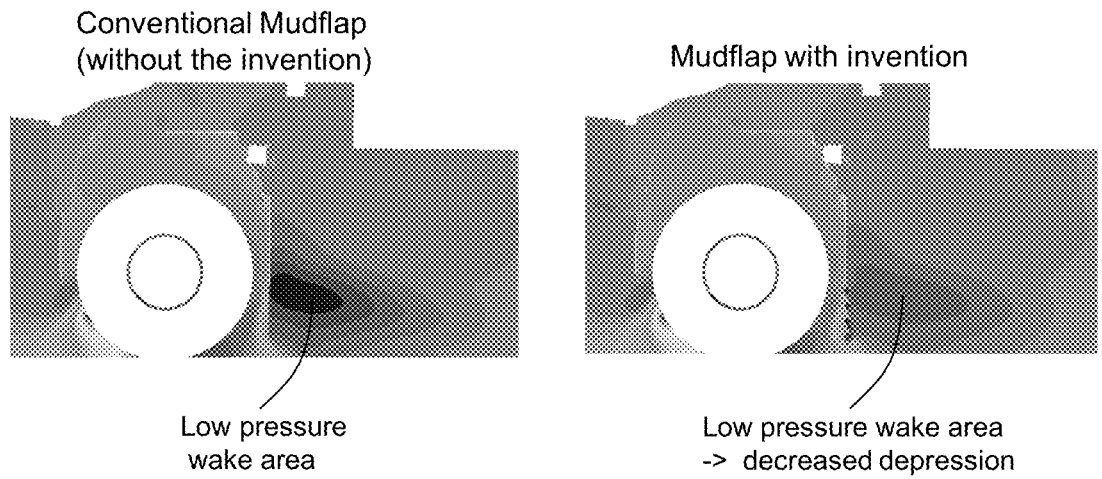
FIG. 7 illustrates an example of aerodynamic performance.

FIG. 7 shows a difference of performance between a conventional mudflap behavior and an improved solution according to the present invention.

At left side the conventional mudflap exhibits a depression area (low pressure) in the wake of the mudflap. By contrast, at right side, with closing members opened, the depression is less and this results in a reduced drag configuration. At cruising speed of above 80 km/h, a small decrease in each wheel arrangement drag can represent a substantial fuel economy on the long run. For a six-wheeler truck and a 6 wheels trailer, this fuel economy can be important.

It should be noted that only the rearmost wheels might be equipped with the mudflap as described above.

The invention claimed is:

1. A mudflap in a wheel arrangement for a vehicle such as a truck or a utility vehicle or a trailer, the mudflap comprising:
   a plate, arranged substantially in a vertical position, the plate being attached to a support in the vehicle, a front side of the plate being oriented toward the wheel, and a rear side of the plate being oriented away from the wheel, wherein the plate is made of hard polymer material, and wherein the plate has a plurality of holes, and
   one or more closing member(s) of a plurality of closing members, wherein a portion of each closing member is attached to and overlaps the plate at a position above at least one hole of the plurality of holes,
   wherein each closing member comprises:
     a rest position in which the closing member substantially closes one or more holes at the rear side thereof, and
     a deflected position in which a dynamic air pressure pushes the closing member away from the rest position, thereby allowing air to pass through the one or more holes, and thereby reducing aerodynamic drag of the mudflap without compromising the protection provided by the mudflap against projections of solid particles or liquid droplets,
   wherein each closing member of the plurality of closing members deflects independently from one another.

2. The mudflap of claim 1, wherein each closing member is formed as a flexible sheet, with a socket portion embodying the portion attached to and overlapping the plate above the at least one hole, and with a deflector portion located opposite the at least one hole.

3. The mudflap of claim 1, wherein each closing member comprises a rigid sheet rotatably mounted on the plate.

4. The mudflap of claim 1, wherein the deflected position exhibits an angular deviation from the rest position, the angular deviation being responsive to an air circulation, the angular deviation being no greater than a predetermined maximum angle.

5. The mudflap of claim 1, wherein each closing member closes a single hole.

6. The mudflap of claim 1, wherein each hole exhibits a rectangular shape.

7. The mudflap of claim 1, wherein the holes are arranged in an array disposition.

8. The mudflap of claim 1, wherein one closing member can close several holes in a row.

9. The mudflap of claim 1, wherein the plate of the mudflap exhibits a thickness comprised between 5 mm and 15 mm.

10. The mudflap of claim 1, wherein a total cross-section of the holes is comprised between 30% to 50% of the overall plate area (H3×W3).

11. The mudflap of claim 1, wherein the plate of the mudflap is rigidly fixed to a support integral with a vehicle chassis.

12. The mudflap of claim 1, further comprising one or more angular stops to stop the angular deflection of the one or more closing member(s).

13. A wheel arrangement for a vehicle such as a truck or a utility vehicle or a trailer, comprising:
   an arcuate wheel cover, and
   the mudflap of claim 1.

14. The wheel arrangement of claim 13, wherein the plate of the mudflap is made integral with the arcuate wheel cover.

15. A vehicle comprising the wheel arrangement of claim 13.

* * * * *